United States Patent
Vignau et al.

(10) Patent No.: US 10,422,926 B2
(45) Date of Patent: Sep. 24, 2019

(54) METHODS OF DETERMINING FRONT PROPAGATION WITHIN A SUBSURFACE VOLUME

(71) Applicant: Total S.A., Paris (FR)

(72) Inventors: Stéphane Vignau, Aberdeen (GB); Florent Lallier, Aberdeen (GB); Michael Montouchet, Aberdeen (GB)

(73) Assignee: Total S.A., Paris (FR)

( * ) Notice: Subject to any disclaimer, the term of this patent is extended or adjusted under 35 U.S.C. 154(b) by 431 days.

(21) Appl. No.: 15/110,280

(22) PCT Filed: Nov. 6, 2014

(86) PCT No.: PCT/EP2014/073981
§ 371 (c)(1),
(2) Date: Jul. 7, 2016

(87) PCT Pub. No.: WO2015/104077
PCT Pub. Date: Jul. 16, 2015

(65) Prior Publication Data
US 2016/0327685 A1  Nov. 10, 2016

(30) Foreign Application Priority Data
Jan. 8, 2014  (EP) .................................. 14305018

(51) Int. Cl.
*G06F 17/50*  (2006.01)
*G01V 99/00*  (2009.01)
*G06F 17/11*  (2006.01)

(52) U.S. Cl.
CPC ............ *G01V 99/005* (2013.01); *G06F 17/11* (2013.01); *G06F 17/5009* (2013.01);
(Continued)

(58) Field of Classification Search
CPC ....................................................... G06F 17/50
(Continued)

(56) References Cited

U.S. PATENT DOCUMENTS

2003/0112704 A1* 6/2003 Goff .......................... G01V 1/30
367/72
2003/0220569 A1* 11/2003 Dione .................. A61B 8/0825
600/443
(Continued)

OTHER PUBLICATIONS

Changdong, Application of fast matching method in shale gas reservoir model calibration (Year: 2013).*
(Continued)

*Primary Examiner* — Lechi Truong
(74) *Attorney, Agent, or Firm* — Winstead PC (57) ABSTRACT

Disclosed is a method of determining front propagation within a subsurface volume such as a reservoir. The subsurface comprises a plurality of cells and at least one geological fault (210). The method comprises performing a fast marching algorithm so as to determine said front propagation in terms of the time of arrival of the front at a particular cell from one or more neighboring cells which make up the neighborhood of said particular cell. For each faulted cell (C) that is adjacent a geological fault, the neighborhood of the faulted cell is defined as comprising only its geometric neighbors ($N_S$, $N_G$ cells and $N_G$ cells) where the geometric neighbors are those cells that are in contact with the faulted cell in a geometric sense, regardless of stratification.

13 Claims, 7 Drawing Sheets

(52) U.S. Cl.
CPC .... *G01V 2210/642* (2013.01); *G01V 2210/66* (2013.01); *G06F 2217/16* (2013.01)

(58) Field of Classification Search
USPC .............................................................. 703/1
See application file for complete search history.

(56) References Cited

U.S. PATENT DOCUMENTS

| | | | |
|---|---|---|---|
| 2007/0044050 A1* | 2/2007 | Hofsass | G06F 17/5081 716/112 |
| 2007/0272407 A1* | 11/2007 | Lehman | E21B 43/26 166/250.1 |
| 2008/0154505 A1 | 6/2008 | Kim et al. | |
| 2009/0035180 A1* | 2/2009 | Wan | C02F 1/008 422/62 |
| 2010/0057418 A1 | 3/2010 | Li et al. | |
| 2010/0252270 A1 | 10/2010 | Kim et al. | |
| 2012/0026167 A1* | 2/2012 | Ran | G06T 17/205 345/420 |
| 2012/0035896 A1 | 2/2012 | Wu et al. | |

OTHER PUBLICATIONS

Bin Zhang, FASER: Fast Analysis of Soft Error Susceptibility for Cell-Based Designs (Year: 2006).*

Pettersen, Øystein; "Basics of Reservoir Simulation with the Eclipse Reservoir Simulator"; Lecture Notes, Dept. of Mathematics, Univ. of Bergen; Dec. 31, 2006; 113 pages.

Bærentzen, J. Andreas; "On the Implementation of Fast Marching Methods for 3D Lattices"; Technical Report, IMM-REP-2001-13, Department of Mathematical Modelling, Technical University of Denmark; Oct. 31, 2000; 19 pages.

Vasco, D.W., et al.; "Estimation of Reservoir Properties Using Transient Pressure Data: An Asymptotic Approach"; Water Resources Research, vol. 36, No. 12; Dec. 2000; pp. 3447-3465.

Sethian, J.A.; "A Fast Marching Level Set Method for Monotonically Advancing Fronts"; Proc. Natl. Adac. Sci., vol. 93, No. 4; Feb. 1996; pp. 1591-1595.

Caumon, Guillaume, et al.; "Structural Framework and Reservoir Gridding: Current Bottlenecks and Way Forward"; 2011 Gussow Geoscience Conference, Banff, Alberta, Canada; Oct. 2011; 8 pages.

Ahmadi, Mohammad; "Modelling and Quantification of Structural Uncertainties in Petroleum Reservoirs Assisted by a Hybrid Cartesian Cut Cell/Enriched Multipoint Flux Approximation Approach"; Submitted for the Degree of Doctor in Philosophy, Institute of Petroleum Engineering, Heriot Watt University, Edinburgh, UK; Apr. 2012; 287 pages.

Xie, Jiang, et al.; "Depth of Investigation and Depletion Behavior in Unconventional Reservoirs Using Fast Marching Methods"; SPE 154532; EAGE Annual Conference & Exhibition, Copenhagen, Denmark; Jun. 2012; 14 pages.

Dijkstra, E.W.; "A Note on Two Problems in Connexion with Graphs"; Numerische Mathematik 1; Jun. 1959; pp. 269-271.

Jbabdi, S., et al.; "Accurate Anisotropic Fast Marching for Diffusion-Based Geodesic Tractography"; International Journal of Biomedical Imaging, vol. 2008; Sep. 2007; 12 pages.

Konukoglu, Ender, et al.; "A Recursive Anisotropic Fast Marching Approach to Reaction Diffusion Equation: Application to Tumor Growth Modeling"; Information Processing in Medical Imaging, vol. 4584, 20th International Conference; Jul. 2007; 12 pages.

Mirebeau, Jean-Marie; "Anisotropic Fast-Marching on Cartesian Grids Using Lattice Basis Reduction"; Sep. 24, 2012; 33 pages.

Tsitsiklis, John N.; "Efficient Algorithms for Globally Optimal Trajectories"; IEEE Transactions on Automatic Control, vol. 40, No. 9; Sep. 1995; pp. 1528-1538.

Brassart, P., "International Search Report," prepared for PCT/EP2014/073981, dated Jul. 1, 2015, seven pages.

* cited by examiner

METHODS OF DETERMINING FRONT PROPAGATION WITHIN A SUBSURFACE VOLUME

The present disclosure relates to methods of determining front propagation within a subsurface volume, and in particular to methods of obtaining a solution to the eikonal equation.

The typical process to establish oil and gas production forecasts includes the construction of subsurface models and simulation of fluid flow and well tests using such models as an input.

Subsurface models may comprise, for example, reservoir flow, basin, and geo-mechanical models. These comprise gridded 3D representations of the subsurface used as inputs to a simulator allowing the prediction and real time monitoring of a range of physical properties as a function of controlled or un-controlled boundary conditions:

Reservoir flow models aim to predict fluid flow properties, primarily multi-phase rates (and composition), pressure and temperature, under oil and gas field or aquifer development scenarios.

Basin models aim to predict over time the types of hydrocarbon being generated out of kerogen, and the location of hydrocarbon trapping at geological timescales.

Geo-mechanical models aim to predict stress and stress related phenomenon such as heave/subsidence or failure in natural conditions or under oil and gas or aquifer development conditions.

Geomodelling techniques may make use of a fast marching algorithm to determine propagation of a front. The common formulation of the Fast Marching algorithm can only be applied on structured reservoir grid where fault and erosion does not result in an irregular cell neighbourhood and where the diffusivity field is isotropic. However most of the known geological reservoirs do not meet these two requirements.

It would therefore be desirable to provide a method of formulating a fast marching algorithm which can be applied on unstructured or faulted grids.

SUMMARY OF INVENTION

In a first aspect of the invention there is provided a method of determining front propagation within a subsurface volume, said subsurface volume being discretised into a plurality of cells and comprising at least one geological fault, said method comprising:

performing a fast marching algorithm so as to determine said front propagation in terms of the time of arrival of the front at a particular cell from one or more neighbouring cells which make up the neighbourhood of said particular cell;

wherein, for each faulted cell that is adjacent a geological fault, the neighbourhood of said faulted cell is defined as comprising only its geometric neighbours, said geometric neighbours being those cells that are in contact with the faulted cell geometrically, regardless of stratification.

Said fast marching algorithm may determine said front propagation in terms of the time of arrival of the front at a particular cell as the minimum of the times of arrival computed from any of its neighbours.

The method may comprise the steps of:

attributing the stratigraphic neighbours of the faulted cell to the neighbourhood of the faulted cell, said stratigraphic neighbours comprising those cells which would contact the faulted cell if the fault was not present;

removing from the neighbourhood of the faulted cell all those cells which are on the opposite side of the fault to the faulted cell; and adding to the neighbourhood of the faulted cell, the geometric neighbours of the faulted cell which are on the opposite side of the fault to the faulted cell.

The method may further comprise the steps of:

attributing the stratigraphic neighbours of the faulted cell to the neighbourhood of the faulted cell, said stratigraphic neighbours comprising those cells which would contact the faulted cell if the fault was not present;

determining the geometric neighbours of the faulted cell which are on the opposite side of the fault to the faulted cell;

removing from the neighbourhood of the faulted cell all those cells which are on the opposite side of the fault to the faulted cell, and which are not geometric neighbours; and adding to the neighbourhood of the faulted cell, the geometric neighbours of the faulted cell which are on the opposite side of the fault to the faulted cell and which are not already included in the neighbourhood of the faulted cell.

The method may comprise a preliminary step to identify as faulted cells, those cells for which a corner and/or vertex is in contact with the fault.

Each of said cells may be a hexahedron.

Said fast marching algorithm may be performed to obtain an expression of the drained volume as a function of diffusive time of flight and the method may further comprise converting this expression to simulate the pressure variation induced by a well test.

Said method further may further comprise the steps of:

performing a plurality of well test simulations using said fast marching algorithm;

performing a comparison of resultant data from each of said well test simulations and resultant data from a measured well test on the actual subsurface volume in order to rank the resultant data from said well test simulations according to whether they reproduce most closely the resultant data from the measured well test; and selecting a subset of the plurality of well test simulations according to the ranking of the resultant data from said well test simulations.

Said comparison step may be performed by computing a distance between different sets of resultant data obtained from different well test simulations. The computing of distance between different sets of resultant data obtained from different well test simulations may comprise using a dynamic time warping algorithm which associates every data point of the resultant data from a first of said well test simulations or measured well test to a corresponding data point of the resultant data from a second of said well test simulations or measured well test.

The method may further comprise the steps of:

constructing a set of vectors associating data points from the first of said well test simulations or measured well test to a corresponding data point from the second of said well test simulations or measured well test; and computing the distance between the data from the first of said well test simulations or measured well test and the second of said well test simulations or measured well test as the trace of the covariance of the difference between the every vector of said set of vectors and a vector which is the mean vector of said set of vectors.

The method may further comprise the step of using said subset of well test simulations in volumetric studies to estimate the porous volume in the subsurface volume and/or the volume of hydrocarbon or water present within the subsurface volume. Alternatively, said subset of well test simulations may be used to predict the fluid flow in a geological reservoir and hydrocarbon and/or water production from said geological reservoir.

In a second aspect of the invention there is provided a method of determining front propagation within a subsurface volume, said subsurface volume being discretised into a plurality of cells, said method comprising:

performing a fast marching algorithm so as to determine said front propagation in terms of the time of arrival of the front at a particular cell from one or more neighbouring cells which make up a neighbourhood of said particular cell;

wherein said fast marching algorithm is performed to obtain an expression of the drained volume as a function of diffusive time of flight and the method further comprises converting this expression to simulate the pressure variation induced by a well test.

Said method further may further comprise the steps of:

performing a plurality of well test simulations using said fast marching algorithm;

performing a comparison of resultant data from each of said well test simulations and resultant data from a measured well test on the actual subsurface volume in order to rank the resultant data from said well test simulations according to whether they reproduce most closely the resultant data from the measured well test; and selecting a subset of the plurality of well test simulations according to the ranking of the resultant data from said well test simulations.

Said comparison step may be performed by computing a distance between different sets of resultant data obtained from different well test simulations. The computing of distance between different sets of resultant data obtained from different well test simulations may comprise using a dynamic time warping algorithm which associates every data point of the resultant data from a first of said well test simulations or measured well test to a corresponding data point of the resultant data from a second of said well test simulations or measured well test.

The method may further comprise the steps of:

constructing a set of vectors associating data points from the first of said well test simulations or measured well test to a corresponding data point from the second of said well test simulations or measured well test; and computing the distance between the data from the first of said well test simulations or measured well test and the second of said well test simulations or measured well test as the trace of the covariance of the difference between the every vector of said set of vectors and a vector which is the mean vector of said set of vectors.

The method may further comprise the step of using said subset of well test simulations in volumetric studies to estimate the porous volume in the subsurface volume and/or the volume of hydrocarbon or water present within the subsurface volume. Alternatively, said subset of well test simulations may be used to predict the fluid flow in a geological reservoir and hydrocarbon and/or water production from said geological reservoir.

Other aspects of the invention comprise a computer program comprising computer readable instructions which, when run on suitable computer apparatus, cause the computer apparatus to perform the method of the first or second aspect; and a computer apparatus specifically adapted to carry out all the steps of any of the method of the first or second aspect.

BRIEF DESCRIPTION OF THE DRAWINGS

Embodiments of the invention will now be described, by way of example only, by reference to the accompanying drawings, in which.

DETAILED DESCRIPTION OF THE EMBODIMENTS

Fast marching algorithms are aimed at computing the minimum time of arrival from a set of source nodes to any other node, according to the speed allocated to each node. It can also be used to compute the minimum distance to the source with a homogenous speed equal to 1. To begin, the background to the fast marching method will be explained.

1/Dijkstra's Algorithm

Fast marching methods are very closely related to Dijkstra's method for computing the shortest path on a network. The base of Dijkstra's algorithm is presented here.

The nodes are separated in three sets: known, trial, unknown.

The known nodes have already been computed and will not be computed again.

The trial nodes have been computed at least once but are likely to be computed again.

The unknown nodes have never been computed but will be computed.

Initialisation:

For each node C,
    Set C as unknown
    Set time(C)=infinity
For each source node S,
    Set S as known
    Set time(S)=0
For each neighbour N of the source nodes,
    If N is not known
        Compute time(N)
        Set N as trial Propagation:

While there is at least one remaining trial node on the mesh,
    Select C the node with minimum time among trial nodes.
    Set C as known.
    For each neighbour N of C, If N is far
   Compute time(N)
   Set N as trial
If N is trial
   Compute time(N)

2/Dijkstra's Method to Compute the Time of Arrival at a Node From its Neighbours With Dijkstra's method, the time of arrival $t_c$ of a node C is computed from its neighbours as follows:

$$t_C = \min_{N \in Neighbours(C)} \left( \frac{\|\overrightarrow{CN}\|}{speed(C)} \right)$$

Now, if this algorithm is applied to compute distances on a discretised Cartesian mesh (which implies that the speed is equal to 1 at every node) and that the neighbours of a node considered are only those adjacent up, down, right and left (and front and behind in 3D) then the result is not an Euclidian distance.

The fast marching algorithms are similar to Dijkstra's algorithm but the possible ways to compute the time of arrival at a node from its neighbours are such that the distances are Euclidian.

3/Eikonal Equation

The following equation is called the eikonal equation, for some "speed" function $s(\vec{x})$:

$$s(\vec{x})\|\vec{\nabla} t(\vec{x})\|=1$$

Its boundary condition is, for some set S:

$$\forall \vec{x} \in \partial S, \, t(\vec{x})=0$$

It has been shown that the solution $t(\vec{x})$ of the eikonal equation is unique and is the minimum time from the point $\vec{x}$ to any point in the set S (source) according to the speed s, which is the distance from $\vec{x}$ to S with the metric tensor $\frac{1}{s^2}\overline{T}$:

$$\begin{cases} t(\vec{x}) = d(\vec{x}, S)_{s^{-2}} \\ \forall \vec{x} \in \partial S, \, t(\vec{x}) = 0 \end{cases}$$

with $\partial S$ the edge of the source S and $d(\vec{x}, S)_{s^{-2}}$ the distance between $\vec{x}$ and the source S with the metric tensor $s^{-2}\overline{T}$. This means that $t(\vec{x})$ is the time of arrival of the front at the location $\vec{x}$ with the speed $s(\vec{x})$. As a result, the solution of the eikonal equation is the aim of any fast marching algorithm.

With Dijkstra's method, $\|\vec{\nabla} t(C)\|$ is basically approximated by $$\frac{t_C - t_N}{\|\overrightarrow{NC}\|}.$$

4/Finite Differences Method

Sethian's fast marching algorithm is aimed at solving the eikonal equation with finite differences approximations. Recalling the expression of the gradient in an orthonormal basis $(\vec{e}_x, \vec{e}_y, \vec{e}_z)$:

$$\vec{\nabla} t(\vec{x}) = \frac{\partial t}{\partial x}\vec{e}_x + \frac{\partial t}{\partial y}\vec{e}_y + \frac{\partial t}{\partial z}\vec{e}_z$$

The mesh is regular and its fibres are aligned with the three axis. $t_{i,j,k}$ is the time of arrival of the front at the node C. $t_{i-1,j,k}$ $t_{i+1,j,k}$ $t_{i,j-1,k}$ $t_{i,j+1,k}$ $t_{i,j,k-1}$ $t_{i,j,k+1}$ are the times of arrival of the neighbouring nodes of C (see FIG. 1).

The algorithm proposed by Sethian approximates each component of $$\frac{\partial t}{\partial x_i}$$

the gradient by the finite differences approximations:
Euler:
Backwards Euler:

$$\frac{\partial t}{\partial x} \approx \frac{t_{i+1,j,k} - t_{i,j,k}}{\Delta x} = D_{ijk}^{+x}$$

$$\frac{\partial t}{\partial x} \approx \frac{t_{i,j,k} - t_{i-1,j,k}}{\Delta x} = D_{ijk}^{-x}$$

and $D_{ijk}^{x}=\max(D_{ijk}^{-x}, -D_{ijk}^{+x}, 0)$.
Replacing $$\frac{\partial t}{\partial x}, \frac{\partial t}{\partial y} \text{ and } \frac{\partial t}{\partial z}$$

by their approximations $D_{ijk}^{x}$, $D_{ijk}^{y}$ and $D_{ijk}^{z}$, the eikonal equation gives:

$$(A_x t_{i,j,k} + B_x)^2 + (A_y t_{i,j,k} + B_y)^2 + (A_z t_{i,j,k} + B_z)^2 = \frac{1}{s(C)^2}$$

with $A_x$, $A_y$ . . . and $B_z$ functions of $\Delta x$, $\Delta y$, $\Delta z$, $t_{i+1,j,k}$, $t_{i,j+1,k}$ . . .

Only one of the two solutions of this quadratic equation is consistent (the highest one). As a result, the time of arrival of the front at each node is computed by taking into account all its neighbours together and not one by one as in Dijkstra's algorithm.

If this algorithm is applied on a discretised Cartesian mesh with a homogeneous speed equal to 1, then the result $t(\vec{x})$ is a Euclidian distance.

5/Optimal Control Method

The algorithm proposed by Tsitsiklis for solving the eikonal equation gives similar results to those obtained by using Sethian's algorithm but it does not use the finite differences.

Tsitsiklis's idea was to compute the time of arrival at the node C as the minimum of the times computed from any barycenter B of its neighbours $N_1$, $N_2$ and $N_3$. Let $N_1$, $N_2$ and $N_3$ be three neighbours of C and B a point inside the triangle $N_1N_2N_3$ (or on the edges). B is the barycentre of the system $\{(N_1, w_1)(N_2, w_2)(N_3, w_3)\}$:

$$\overrightarrow{BC} = w_1\overrightarrow{N_1C} + w_2\overrightarrow{N_2C} + w_3\overrightarrow{N_3C}$$

with positive weights $w_1$, $w_2$ and $w_3$ such that their sum is equal to 1: $w_1+w_2+w_3=1$. The time of arrival of the front at B is approximated by a linear combination of the times of its neighbours, whose coefficients are the weights $w_1$, $w_2$ and $w_3$:

$$t_B = w_1 t_{N_1} + w_2 t_{N_2} + w_3 t_{N_3}$$

Then, as in Dijkstra algorithm, the time of arrival at C is the time at B plus the time from B to C:

$$t_C = t_B + \frac{\|\overrightarrow{BC}\|}{s(C)}$$

The optimal control method proposed by Tsitsiklis consists in computing the weights $w_1$, $w_2$ and $w_3$ which minimise $t_C$:

$$t_C = \underset{B \in N_1N_2N_3}{\text{Min}}\left(t_B + \frac{\|\overrightarrow{BC}\|}{s(C)}\right)$$

$$= \underset{\substack{w_1,w_2,w_3 \geq 0 \\ w_1+w_2+w_3=1}}{\text{Min}}\left(w_1 t_{N_1} + w_2 t_{N_2} + w_3 t_{N_3} + \frac{\|w_1\overrightarrow{N_1C} + w_2\overrightarrow{N_2C} + w_3\overrightarrow{N_3C}\|}{s(C)}\right)$$

This can be done by setting $w_3 = 1-(w_1+w_2)$ and computing the partial derivatives of $$t_B + \frac{\|\overrightarrow{BC}\|}{s(C)}$$

with respect to $w_1$ and $w_2$. If the weights that cancel out these partial derivatives are positive and their sum is equal to 1 then the optimal control is reached and $t_c$ is computed with them. If not then the optimal control is reached by setting B on the edges of the triangle $N_1N_2N_3$.

6/Combination of Neighbours (Tsitsiklis' Algorithm)

The time at C is computed from the times at $N_1$, $N_2$ and $N_3$. But the combinations of neighbours $N_1$, $N_2$ and $N_3$ are not all consistent.

If C is a node, then let N(C) be its neighbourhood.

The standard neighbourhood is defined thusly: if (i,j) is the index of the node C then its standard neighbourhood is made of the cells whose indexes are (i−1, j−1), (i−1,j), (i−1,j+1), (i,j−1), (i,j+1), (i+1,j−1), (i+1,j), (i+1,j+1).

Let us define the index distance $d(.,.)_{index}$:

for any node A and B: $d(A,B)_{index} = \sqrt{(i_A-i_B)^2+(j_A-j_B)^2+(k_A-k_B)^2}$ If the neighbourhood of any node in the mesh is standard, the two neighbours (three neighbours in 3 dimensions) must respect the following conditions:

$d(C, N_1)_{index} = 1$
$d(N_1, N_2)_{index} = 1$
$d(N_2, N_3)_{index} = 1$ (in three dimensions)

However, in complex meshes, some nodes may have a complex neighbourhood. In such a case, the conditions based on the index distance are not valid anymore. The conditions to apply are:

$N_1 \in N(C)$
$N_2 \in N(N_1)$ and $N_2 \in N(C)$
$N_3 \in N(N_2)$, $N_3 \in N(N_1)$ and $N_3 \in N(C)$ (in 3 dimensions)

7/Anisotropic Fast Marching

New Scalar Product, Norm and Riemannian Metric

Defining a new scalar product $\langle .|. \rangle_{\bar{s}(\vec{x})^{-2}}$ and the associated Euclidian norm $\|.\|_{\bar{s}(\vec{x})^{-2}}$ and distance $d(.,.)_{\bar{s}(\vec{x})^{-2}}$:

$$\forall (\vec{u},\vec{v}) \in (\mathbb{R}^d)^2, \langle \vec{u}|\vec{v} \rangle_{\bar{s}(\vec{x})^{-2}} = \vec{u} \cdot \bar{s}(\vec{x})^{-2} \cdot \vec{v}$$

$$\forall \vec{u} \in \mathbb{R}^d, \|\vec{u}\|_{\bar{s}(\vec{x})^{-2}} = \sqrt{\langle \vec{u}|\vec{u} \rangle_{\bar{s}(\vec{x})^{-2}}}$$

For any points A and B: $d(A,B)$: $d(A,B)_{\bar{s}(\vec{x})^{-2}} = \sqrt{\overrightarrow{AB} \cdot \bar{s}(\vec{x})^{-2} \cdot \overrightarrow{AB}}$ As a result, the tensor $\bar{s}(\vec{x})^{-2}$ is the new Riemannian metric tensor.

Anisotropic Fast Marching

The anisotropic fast marching is aimed at computing the minimum distance from the source given the Riemannian metric tensor $\bar{s}(\vec{x})^{-2}$ (symmetric definite positive):

$$\begin{cases} t(\vec{x}) = d(\vec{x}, S)_{\bar{s}(\vec{x})^{-2}} \\ \forall \vec{x} \in \partial S, t(\vec{x}) = 0 \end{cases}$$

$\partial S$ the edges of the source S.

$\bar{s}(\vec{x})$ is called the speed tensor, $\bar{s}(\vec{x})^{-1}$ the slowness tensor and t the time of arrival.

Homogeneous Anisotropic Speed and Single Source

The time of arrival at P, for an homogeneous medium and a single source S is:

$$t(P) = d(P,S)_{\bar{s}(\vec{x})^{-2}} = \|\overrightarrow{SP}\|_{\bar{s}(\vec{x})^{-2}} = \sqrt{\overrightarrow{SP} \cdot \bar{s}(\vec{x})^{-2} \cdot \overrightarrow{SP}}$$

In such a case, the level sets of the time of arrival are no longer circles but ellipsoids. The streamlines of the gradient of the time are no longer straight lines but geodesics.

Anisotropic Eikonal Equation

It has been shown that the following system:

$$\begin{cases} t(\vec{x}) = d(\vec{x}, S)_{\bar{s}(\vec{x})^{-2}} \\ \forall \vec{x} \in \partial S, t(\vec{x}) = 0 \end{cases}$$

is equivalent to the anisotropic eikonal equation:

$$\vec{\nabla} t(\vec{x}) \cdot \bar{s}(\vec{x})^2 \cdot \vec{\nabla} t(\vec{x}) = 1$$

8/Finite Differences Method and Anisotropy

The finite differences method can be adapted to take into account anisotropy. Like in the isotropic case, the eikonal equation is approximated by the finite differences approximations. However, these approximations generate errors when the principal directions of anisotropy are not aligned with the grid's axis.

9/A Modified Finite Differences Method for Anisotropy: Recursive Anisotropic Fast Marching The recursive anisotropic fast marching is similar to Sethian's algorithm but Konukoglu (2007) introduces a buffered band in Djikstra's algorithm between the known nodes and the trial nodes to correct the error produced by the anisotropy. The nodes that leave the trial band are not set as known immediately but they are set as buffered. Then some loops modify the times of the nodes in the buffer band before they are set as known.

10/Optimal Control and Anisotropy

As in the original Tsitsiklis' algorithm, the optimal control method for anisotropy consists in computing the weights $w_1$, $w_2$ and $w_3$ which minimise the quantity:

$$t_C = \min_{B \in N_1 N_2 N_3} \left( t_B + \|\overrightarrow{BC}\|_{\overline{s}^{-2}} \right)$$

$$= \min_{\substack{w_1, w_2, w_3 \geq 0 \\ w_1 + w_2 + w_3 = 1}} \left( \frac{w_1 t_{N_1} + w_2 t_{N_2} + w_3 t_{N_3} +}{\|w_1 \overrightarrow{N_1 C} + w_2 \overrightarrow{N_2 C} + w_3 \overrightarrow{N_3 C}\|_{\overline{s}^{-2}}} \right)$$

but the distances and the scalar products are now computed with the riemannian metric tensor $\overline{s}^{-2}$. The stencil used no longer only contains 4 neighbours, or 6 in 3D, but 8 neighbours, or 26 in 3D.

11/Multi-Stencil Optimal Control Method

The optimal control method seems to be inconsistent when the anisotropy ratio is too high. The stencil of the neighbourhood can be changed in order to tackle this issue. As a result, high speed anisotropy ratio can be handled by huge stencils.

All the possible algorithms are based on Dijkstra's algorithm. Only the method of computing the time of arrival at a node from its neighbours differs according to each method.

12/Faulted Grids—Neighbourhood of Faulted Cells

The common formulation of the Fast Marching algorithm can only be applied on a structured reservoir grid where fault and erosion does not result in a cell neighbouring order different from that of i±1, j±1, or k±1 (see FIG. 1), and where the diffusivity field is isotropic. However most of the known geological reservoirs do not respect these two requirements.

It is therefore proposed to use a formulation of the Fast Marching Algorithm running on any structured reservoir grid where grid cells are hexahedra in 3D or quadrilaterals in 2D, and where the parameter (e.g. permeability) field is heterogeneous, anisotropic and not necessarily aligned on the grid. Such a formulation can be used, for example, to simulate well tests on geomodels. The methodology is based on the Tsitsiklis' algorithm which has been transformed to run on previously described geomodels.

Geological grids can contain faults. Cells that are in contact with a fault are referred to herein as "faulted cells". The stratigraphic neighbourhood of a faulted cell C comprise those cells (stratigraphic neighbours) which would contact cell C if the fault was not present. Depending on definition, this neighbourhood may or may not include neighbouring cells which are diagonally adjacent cell C. One or more of the stratigraphic neighbours of a faulted cell may have no contact with the faulted cell.

Figure 1:
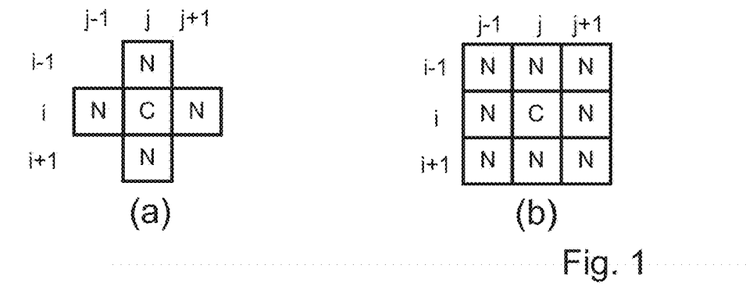
FIG. 1 illustrates the known method for determining a neighbourhood of a cell when performing a fast marching algorithm.

FIG. 1 illustrates how the stratigraphic neighbourhood of a cell is usually determined by application of a stencil. For the 4-cell stencil (6-cell in 3 dimensions) illustrated in FIG. 1(a), if the index of the cell C is (i,j), then the indices of its stratigraphic neighbours N which make up the neighbourhood of cell C are: (i−1,j), (i+1,j), (i,j−1), (i,j+1). For the 8-cell stencil (26-cell in 3 dimensions) illustrated in FIG. 1(b), if the index of the cell C is (i,j), then the indices of its stratigraphic neighbours N which make up the neighbourhood of cell C are: (i−1,j), (i+1,j), (i,j−1), (i,j+1), (i−1,j−1), (i−1,j+1), (i+1,j−1), (i+1,j+1).

It is proposed herein that the neighbourhood of a faulted cell is sought geometrically and not only by considering the index of its stratigraphic neighbours. Neighbours of a cell which are not stratigraphic neighbours will be referred to herein as geometric neighbours. Geometric neighbours are the cells which neighbour (i.e., are physically adjacent to and/or are physically in contact with) a particular cell in a geometric sense, regardless of stratification.

Figure 2:
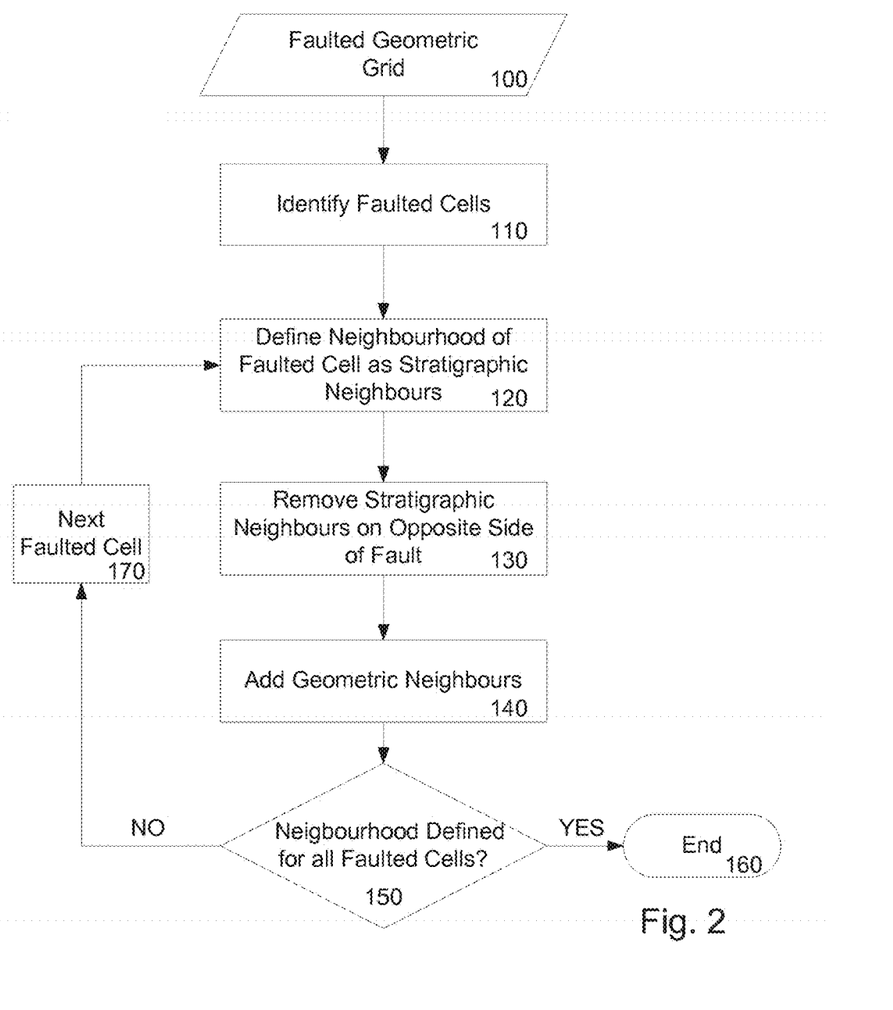
FIG. 2 is a flow diagram illustrating a method for determining the neighbourhood of a faulted cell according to an embodiment of the invention.

FIG. 2 is a flowchart showing an exemplary method for determining the neighbourhood of a faulted cell:

The initial data 100 is a geometric grid comprising a fault. At step 110, the faulted cells are identified. The faulted cells are defined as those cells which are in contact with the fault. The faulted cells should include those cells for which a corner and/or vertex is adjacent (in contact with) the fault.

For each faulted cell, its neighbourhood is defined as follows:

At step 120,: initially define the neighbourhood of the faulted cell as comprising the stratigraphic neighbours of the faulted cell;

At step 130: remove from the neighbourhood of the faulted cell all those cells within the stratigraphic neighbourhood of the faulted cell which are on the opposite side of the fault to the faulted cell; and At step 140: update the neighbourhood of the faulted cell by attributing the faulted cell's geometric neighbours to its neighbourhood.

At step 150 a determination is made as to whether all the faulted cells have had their neighbourhoods defined. If yes, the method ends at step 160. If no, the algorithm considers the next faulted cell (step 170) and steps 120 to 150 are repeated for this faulted cell.

As a result of this method, a cell can have more or fewer neighbours than the number of neighbours it would have in a regular grid. For example, instead of the 8 neighbours of the regular arrangement illustrated in FIG. 1(b), the geometric neighbourhood of a faulted cell may comprise more or fewer than 8 neighbours in 2D (or more or fewer than 26 neighbours in 3D).

Figure 3:
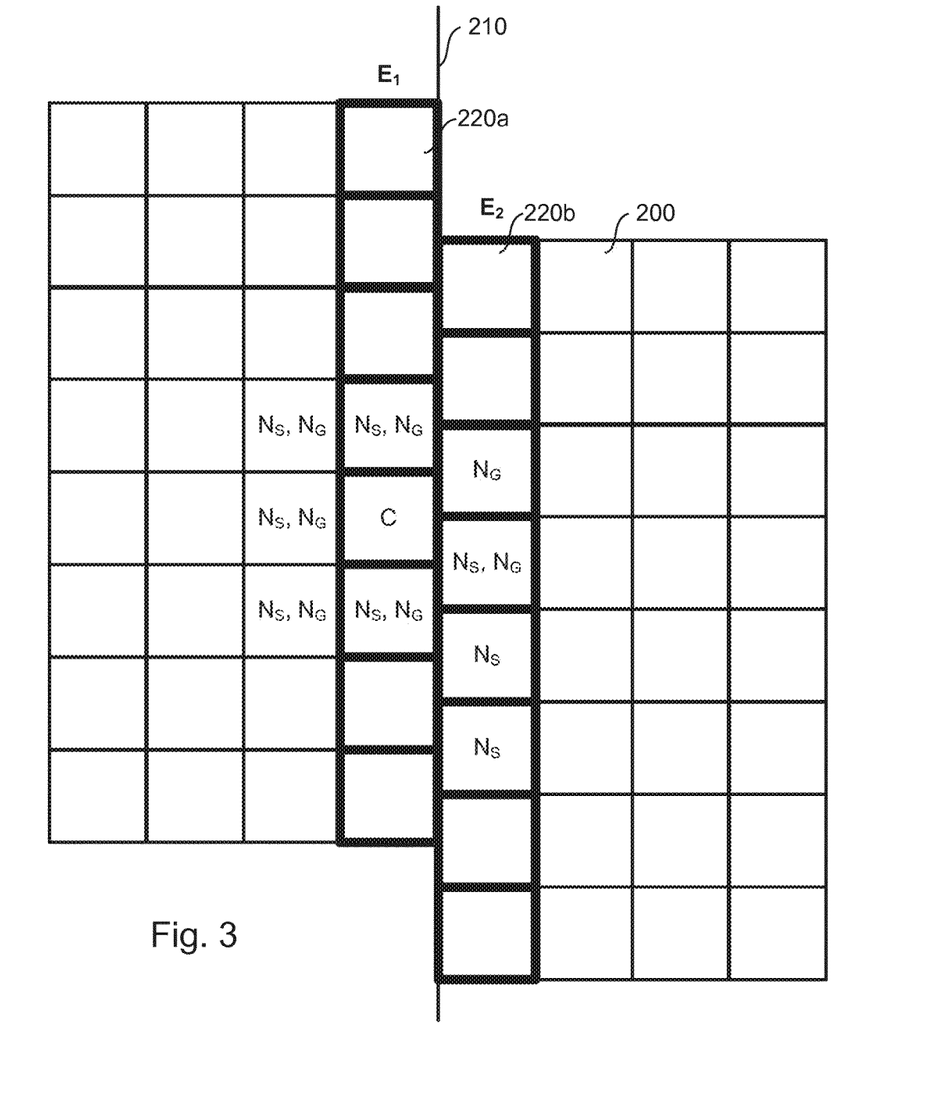
FIG. 3 illustrates a 2D grid of cells comprising a fault, and the corresponding stratigraphic and geometric neighbours of a cell.

FIG. 3 shows a 2D grid illustrating an area discretised into cells. Also shown is a fault 210. The cells 220a, 220b which are adjacent the fault 210, that is the cells comprised within sets $E_1$ and $E_2$ and shown with bold line, are referred to as faulted cells. The remaining cells 200 are unfaulted cells. The faulted cells 220a on a first side of the fault are comprised within a first set $E_1$ and the faulted cells 220b on the side opposite the first side of the fault are comprised within a second set $E_2$.

In FIG. 3, one faulted cell has been designated cell C. Cells which are both stratigraphic neighbours and geometric neighbours are labelled $N_S$, $N_G$, cells which are stratigraphic neighbours only are labelled $N_S$, and cells which are geometric neighbours only are labelled $N_G$. As can be seen, cell C has 8 stratigraphic neighbours and 7 geometric neighbours.

Figure 4:
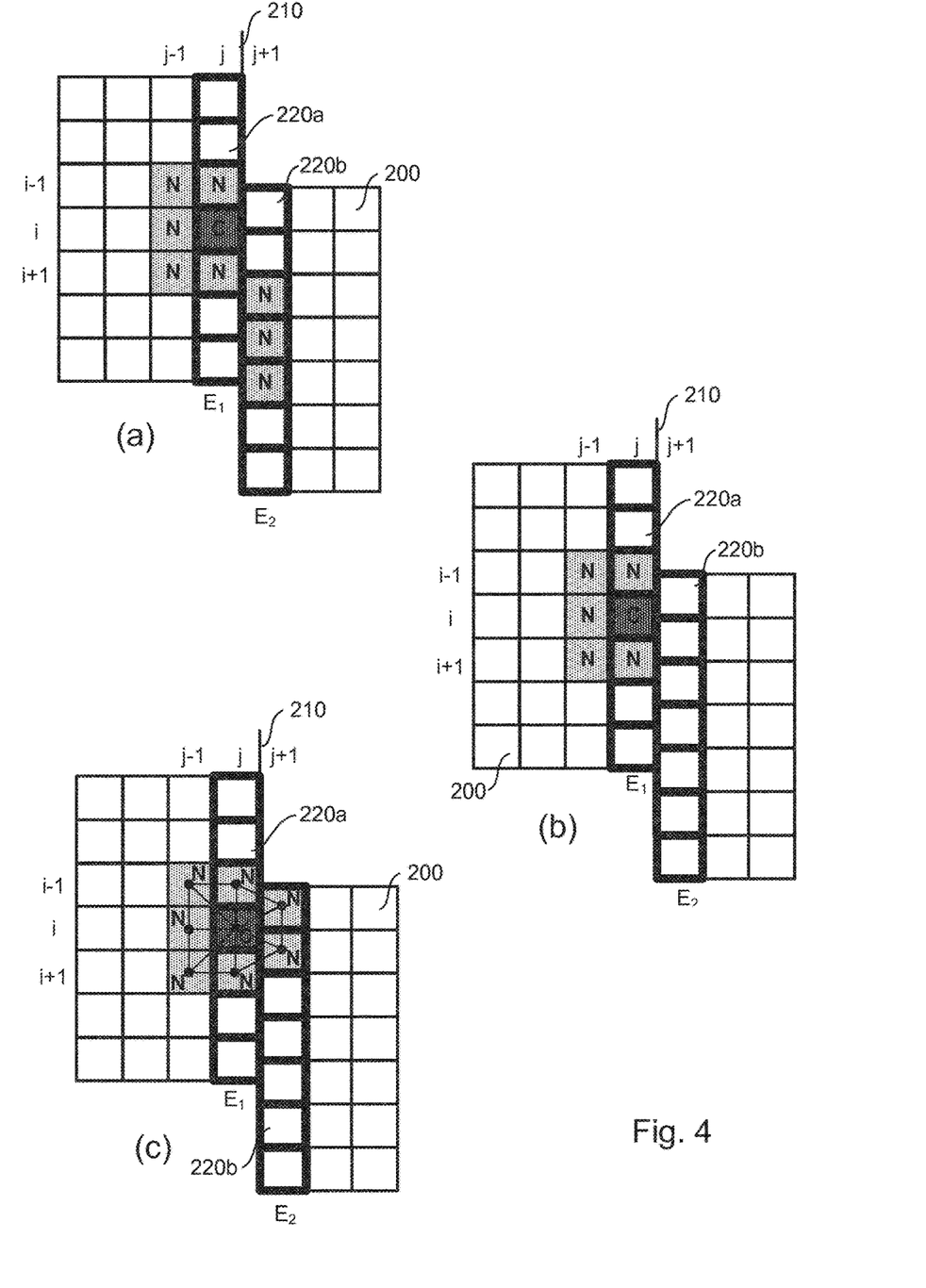
FIG. 4 illustrates the steps of a method for determining the neighbourhood of a faulted cell according to an embodiment of the invention.

FIG. 4(a), FIG. 4(b) and FIG. 4(c) respectively illustrate steps 120, 130 and 140 of FIG. 2, for determining the neighbourhood of faulted cells in an exemplary embodiment. These steps are performed for each of the faulted cells in both set $E_1$ and set $E_2$. To begin, each cell has attributed thereto a neighbourhood comprising its stratigraphic neighbours. Accordingly, FIG. 4(a) shows a faulted cell C and the set of neighbouring cells N which are considered to make up the neighbourhood of cell C. In FIG. 4(a), the neighbourhood of cell C comprises cell C's stratigraphic neighbours. As can be seen, none of the neighbours N that are on the side of fault 210 opposite to that of cell C, are in contact with cell C.

In FIG. 4(b), the neighbouring faulted cells that are on the opposite side of the fault to cell C (that is those within set $E_2$) are removed from the neighbourhood of cell C. In an embodiment, all of these cells are removed from the neighbourhood of cell C even if the cell being removed is a geographic neighbour. However, in an alternative embodiment, it may be determined at this step whether faulted cells on the opposite side of the fault to cell C (that is those within set $E_2$) are geometric neighbours, such that only those cells which are determined not to be geometric neighbours of cell C are removed from the neighbourhood of cell C. In this alternative embodiment, the next step in omitted.

In FIG. 4(c), the cells within set $E_2$ which contact cell C, that is the cells within set $E_2$ which are geometric neighbours of cell C, are added to the neighbourhood N of cell C.

Presenting this methodology as a workflow:

If C is a cell, then $N_0(C)$ is the set of its usual stratigraphic neighbours (4 cells in 2 dimensions and 6 cells in 3 dimensions).

If C is a cell, then $N_1(C)$ is the extended set of its usual stratigraphic neighbours (8 cells in 2 dimensions and 26 cells in 3 dimensions).

$E_1$ is the set of faulted cells on a side of the fault and $E_2$ the set of cells on the opposite side.

All the cells in $E_2$ are removed from the neighbourhood of each cell in $E_1$ and all the cells in $E_1$ are removed from the neighbourhood of each cell in $E_2$:
   For each cell $C_1 \in E_1$,
      For each neighbour $N \in N_1(C_1)$,
         If $N \in E_2$ then remove N from $N_1(C_1)$ and remove $C_1$ from $N_1(N)$.
   For each cell $C_2 \in E_2$,
      For each neighbour $N \in N_1(C_2)$,
         If $N \in E_1$ then remove N from $N_1(C_2)$ and remove $C_2$ from $N_1(N)$.

For each cell in $E_1$ its neighbourhood is updated with all its geometric neighbours in $E_2$, and conversely, for each cell in $E_2$ its neighbourhood is updated with all its geometric neighbours in $E_1$:
   For each cell $C_1 \in E_1$,
      For each cell $C_2 \in E_2$,
         If $C_2$ is a geometric neighbour of $C_1$ then add $C_2$ in $N_1(C_1)$ and add $C_1$ in $N_1(C_2)$.

Figure 5:
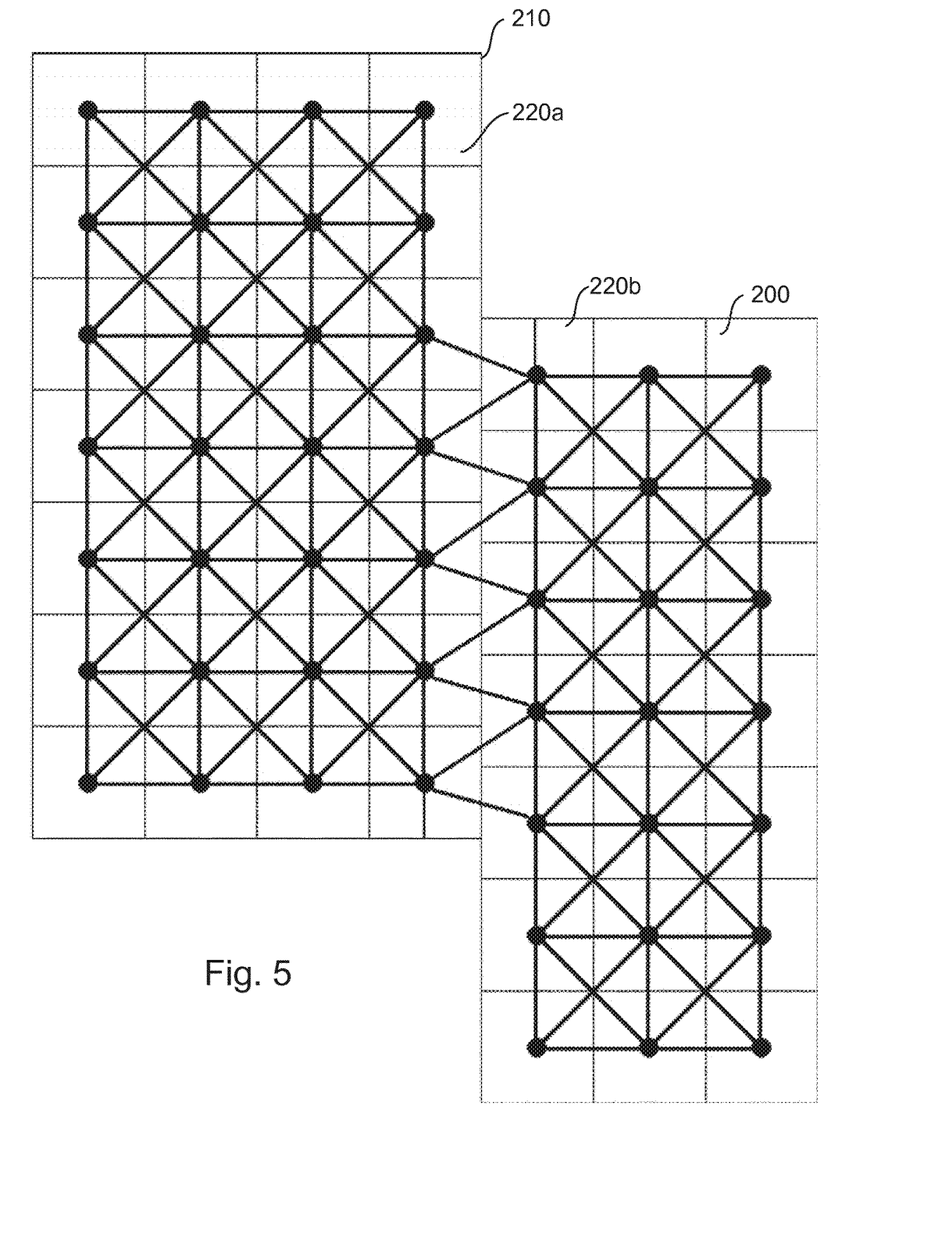
FIG. 5 illustrates the neighbourhood arrangement for the example grid illustrated in FIG. 4, after the neighbourhood for each constituent cell has been determined.

FIG. 5 shows the resultant neighbourhood arrangement for the example grid illustrated in FIG. 4, when the neighbourhoods have been updated for each of the faulted cells.

Figure 6:
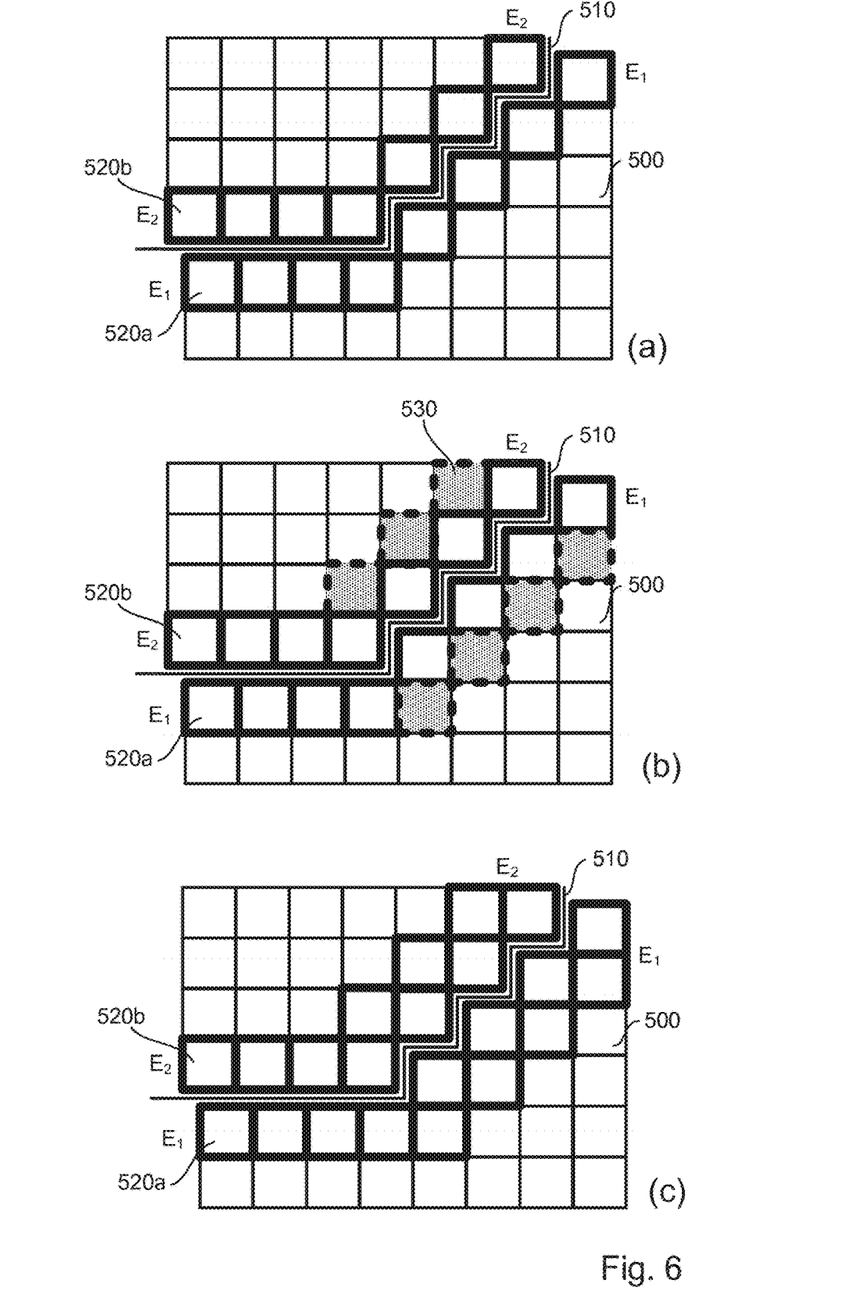
FIG. 6 illustrates an optional preliminary step which may be performed prior to the steps illustrated in FIG. 4, in accordance with an embodiment of the invention.

FIG. 6 illustrates an additional, preliminary, step which may form part of step 110 of the flowchart of FIG. 2. This step extends the set of faulted cells, prior to the determination of the neighbourhood for each faulted cell using the methodology described above. In this way, the neighbours of the faulted cells are identified when the fault is not aligned on an axis of the grid.

FIG. 6(a) shows a grid comprising a fault 510. As before, the grid comprises a number of faulted cells 520a, 520b (shown with unbroken bold line), and unfaulted cells 500. The faulted cells 520a on a first side of the fault are comprised within a first set $E_1$ and the faulted cells 520b on the side opposite the first side of the fault are comprised within a second set $E_2$.

FIG. 6(b) shows the effect of application of this step. The shaded cells 530, having broken bold line, are cells which have a corner (or vertex for the 3D example) in contact with the fault 510. These shaded cells 530 are considered faulted cells and are added to the sets of faulted cells $E_1$ and $E_2$ depending on which side of the fault they lie.

FIG. 6(c) shows the extended set of faulted cells $E_1$ and $E_2$ following application of this preliminary step.

Presenting the methodology of the preliminary step as a workflow (C, $N_0(C)$, $N_1(C)$ $E_1$ and $E_2$ are as defined in the previous workflow):
   For each cell $C_1 \in E_1$,
      For each neighbour $N_1 \in N_0(C_1)$, if $N_1$ is not faulted,
         For each neighbour $N \in N_1(N_1)$, if N is faulted,
            If $N \in E_2$ then add $N_1$ in $E_1$.
   For each cell $C_2 \in E_2$,
      For each neighbour $N_2 \in N_0(C_2)$, if $N_2$ is not faulted,
         For each neighbour $N \in N_1(N_2)$,
            If $N \in E_1$ then add $N_2$ in $E_2$.

A specific application for the above described methodology for updating the neighbourhood of faulted cells finds many uses in geological modelling. One specific application, described herein by way of example, is to help solve the eikonal equation for well test based geomodel screening. Well testing is a commonly used dynamic data acquisition method that can yield information describing (for example) the porous volume connected to the well and/or the geometry of the investigation zone of the well test. In order to validate/invalidate, sort or rank geological models according to measured well tests, flow simulation is commonly performed. In such flow simulations, a pressure equation is solved globally. The drawback of this approach is the computation time.

It is known that pressure variation induced by a well test can be modelled by solving locally the diffusive pressure equation. The benefit is that the computation time is shorter than the computation time using the more common methodology. This equation can be linked to the eikonal equation, solved using the Fast Marching algorithm. The result is an expression of the drained volume as a function of diffusive time of flight. Diffusive time of flight is the common name of the "time" computed as described. It is not the real time, but it can be linked to the real time using the flow regime. Diffusive time of flight can be transformed into pressure versus (real) time if the flow regime is known at every time of the propagation of the pressure front.

Computing the flow regime at each time of the propagation of a pressure front is a time consuming task. In order to speed up the computation time, flow regimes are considered a-priori known and symmetric. These assumptions are strong and create a time distortion in the computed well pressure evolution. Consequently, these assumptions normally limit the applicability of the Eikonal equation for the simulation of well tests.

Simulated well tests on geomodels using the methods described above can be compared against each other and with the measured well test on the actual geological reservoir in order to rank the geomodels and select those which reproduce most closely the measured well test data. This ranking can be performed by computing a distance between different simulated well tests and between one or more simulated well tests and one or more measured well tests. The selected geomodels can then be used in volumetric studies in order to estimate the porous volume in the geological reservoir and/or the volume of hydrocarbon or water. The selected geomodels can also be used to predict the fluid flow in the geological reservoir and the hydrocarbon and/or water production. Additionally, the selected geomodels can be used as input for a history matching method.

Figure 7:
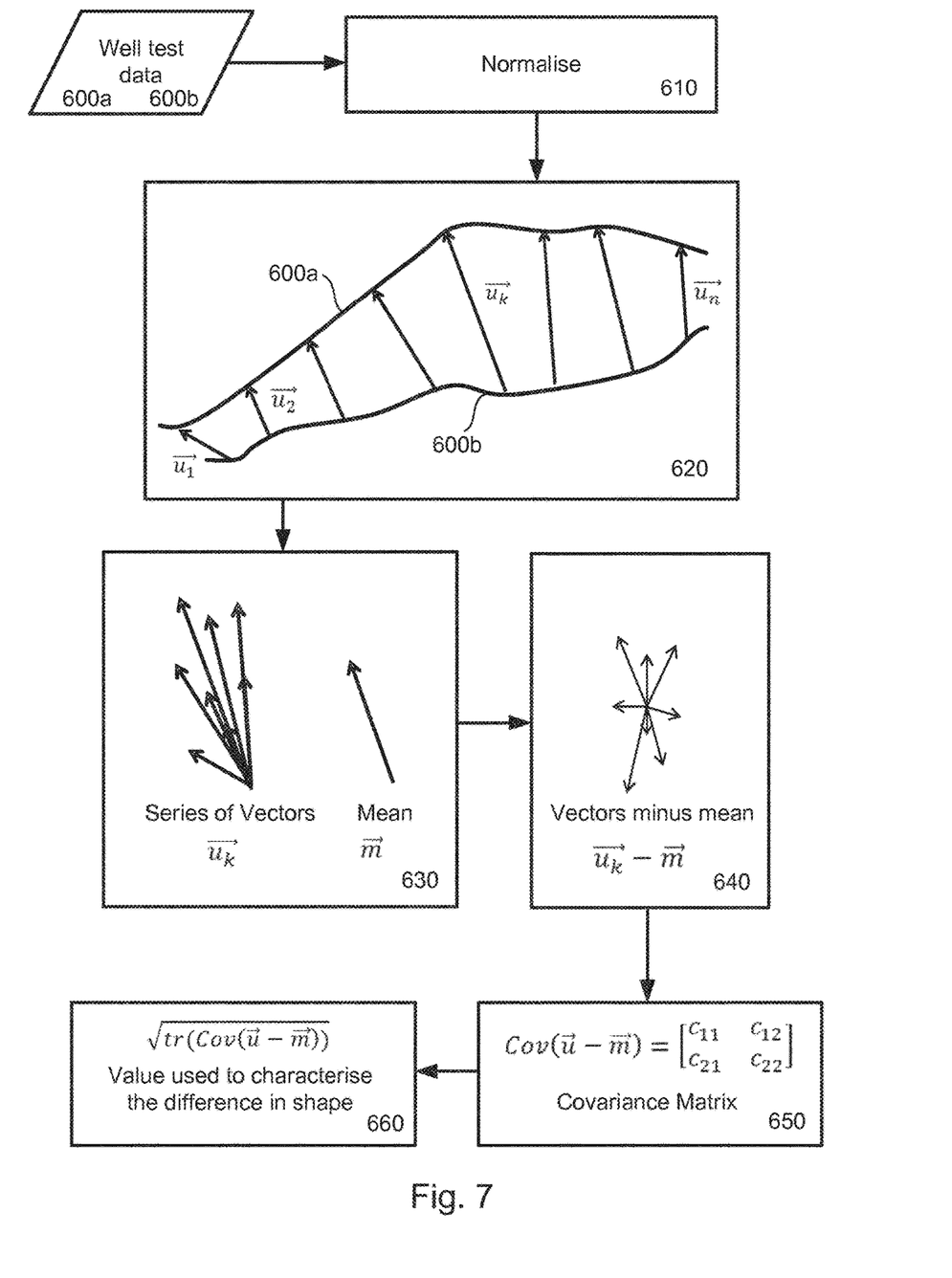
FIG. 7 is a flow diagram illustrating the method of comparing the results of simulated and/or real well tests according to an embodiment of the invention.

FIG. 7 illustrates how the distance between sets of well test data comprising the results of a first well test 600a and a second well test 600b may be computed: At step 610, the results of the two well tests 600a, 600b are normalised.

At step 620, a dynamic time warping (DTW) algorithm is used to associate every point of the first well test 600a to a corresponding point of the second well test 600b. Euclidian distance may be used as a cost function for the DTW algorithm.

At step 630, a set of vectors $\vec{u}_k$ associating data points of the first well test 600a to the second well test 600b is determined, as is a vector $\vec{m}$ which is the mean vector of $\vec{u}_k$.

At step 640, the difference between every vector of $\vec{u}_k$ and the vector $\vec{m}$ is calculated.

At step 650, the covariance of the difference between every vector of $\vec{u}_k$ and the vector $\vec{m}$ calculated.

At step 660, the distance between the two sets of well test data 600a, 600b is computed as the trace of the covariance of the difference between every vector of $\vec{u}_k$ and vector $\vec{m}$ as calculated at step 650. This distance is used to characterise the difference in shape of the plot of data points of first well test 600a and the plot of data points of second well test 600b.

Figure 8:
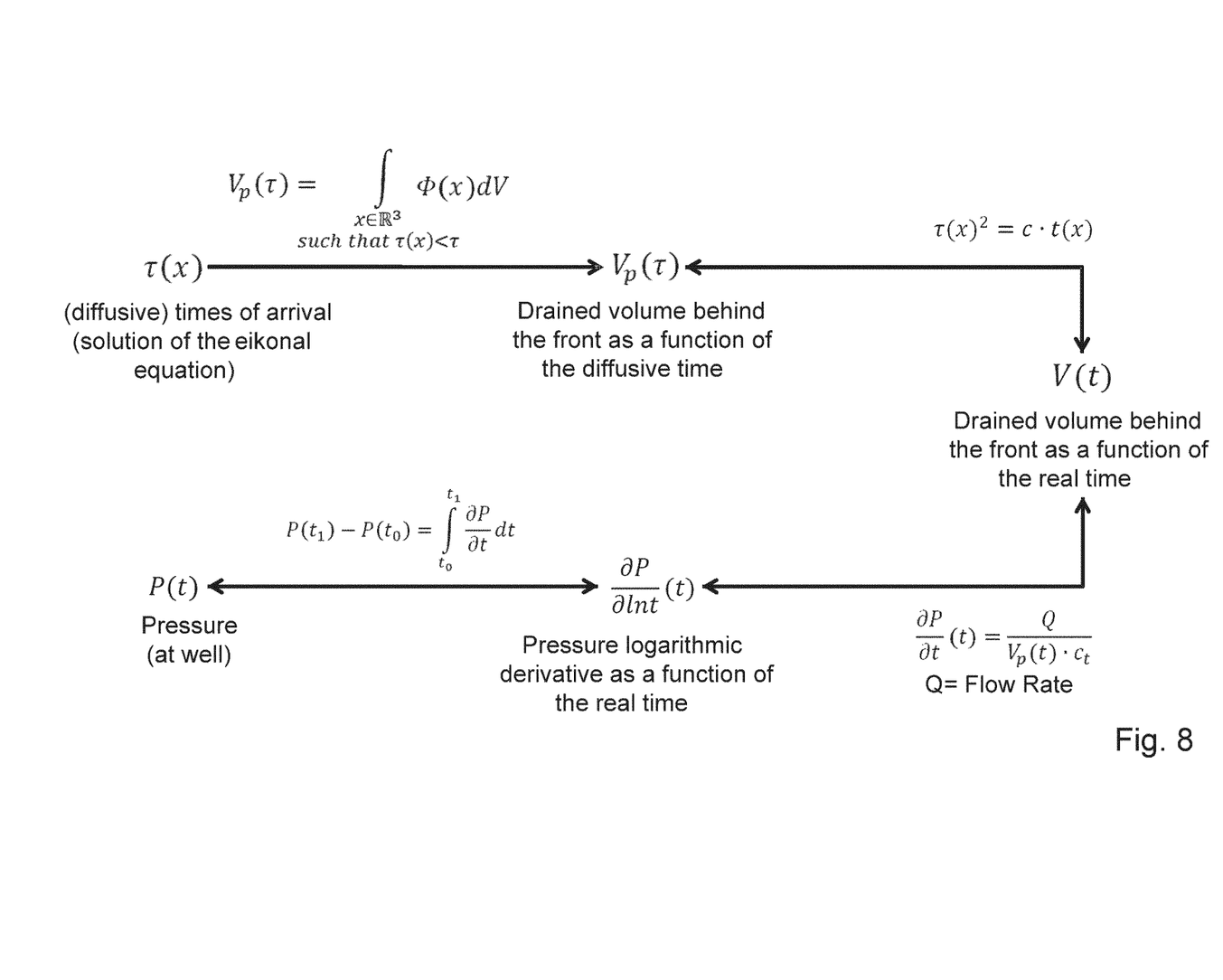
FIG. 8 is a flow diagram illustrating the relationship between the solution of the eikonal equation which yields (diffusive) times of arrival and the pressure at the well.

FIG. 8 illustrates the relationship between the solution of the eikonal equation which yields diffusive times of arrival τ(x) (in the diffusive time domain) and the pressure at the well P(t) (in the time domain). The solution of the eikonal equation is obtained using the methods described herein, with relation to FIGS. 1 to 5. The pressure at the well may be directly observed (measured). The results of any of the intermediate steps may be compared using the methodology described with reference to FIG. 7. More specifically, it is possible to compute the pressure derivative $$\frac{\partial P}{\partial \ln t}(\tau)$$

and the drained volume V(τ) as functions of the diffusive time τ from the pressure derivative $$\frac{\partial P}{\partial \ln t}(t)$$

and the drained volume V(t) as functions of the real time t (and vice versa) using the regime coefficient c. Note that Φ(x) is the porosity of cell x, and Q is flow rate.

The regime coefficient c can be determined from:
each well-test simulation (from the fast marching results)
the real well-test When performing the comparison illustrated in FIG. 7, there are two values that can be compared: the drained volume and the pressure derivative. There are two domains in which the comparison can be performed: the time domain and the diffusive time domain. As a consequence, the comparison illustrated by FIG. 7 can be performed according to a number of possibilities, which include:

1. Working in the diffusive time domain. In this case:
   a. The real well test is interpreted manually or using any available commercial numerical tool, so as to determine the flow regime at every time of the well test. Using this flow regime, the well test is transformed from the time domain to the diffusive time domain;
   b. The simulated well test, obtained using a fast marching method as disclosed herein, is therefore obtained in the diffusive time domain;
   c. In the diffusive time domain the following can be compared: the drained volume, the pressure derivative and/or the shape of the pressure derivative.
2. Working in the time domain. In this case:
   a. The real well test is by definition already in the time domain;
   b. From the flow regime interpreted on the real well test, the simulated well test is transformed into the time domain;
   c. In the time domain the following can be compared: the drained volume, the pressure derivative and/or the shape of the pressure derivative.

It has been observed that during computation of the pressure there may be an error in the determined pressure at origin during integration. This may be as a result of the divergence of the integration at origin:

$$\frac{\partial P}{\partial t} = \frac{Q}{\chi_T V_P}, \quad V_P \underset{t \to 0}{\to} 0, \quad \frac{\partial P}{\partial t} \underset{t \to 0}{\to} +\infty, \quad \int_{t_0}^{t_1} \frac{\partial P}{\partial t} dt \underset{t \to 0}{\to} +\infty$$

Therefore, to match the real curve, the integral should begin at a time after the beginning of the well test.

One or more steps of the methods and concepts described herein may be embodied in the form of computer readable instructions for running on suitable computer apparatus, or in the form of a computer system comprising at least a storage means for storing program instructions embodying the concepts described herein and a processing unit for performing the instructions. As is conventional, the storage means may comprise a computer memory (of any sort), and/or disk drive, optical drive or similar. Such a computer system may also comprise a display unit and one or more input/output devices.

The concepts described herein find utility in all aspects (real time or otherwise) of surveillance, monitoring, optimisation and prediction of hydrocarbon reservoir and well systems, and may aid in, and form part of, methods for extracting hydrocarbons from such hydrocarbon reservoir and well systems.

It should be appreciated that the above description is for illustration only and other embodiments and variations may be envisaged without departing from the spirit and scope of the invention.

The invention claimed is:

1. A method of determining front propagation within a subsurface volume, said subsurface volume being discretised into a plurality of cells forming a grid and comprising at least one non-discretized geological fault, said method comprising:
   performing a fast marching algorithm so as to determine said front propagation in terms of a time of arrival of the front at a particular cell from at least one neighbouring cells which make up a neighbourhood of said particular cell; and
   wherein, for each faulted cell that is adjacent a geological fault, which is not aligned on an axis of the grid, the neighbourhood of said faulted cell is defined as comprising only its geometric neighbours, said geometric neighbours being all non-faulted stratigraphic neighbours and all other faulted cells on each side of the fault that are adjacent to or geometrically in contact with the faulted cell, regardless of stratification of the subsurface volume;

obtaining from said fast marching algorithm, an expression of a drained subsurface volume as a function of diffusive time of flight;

converting the expression to simulate a pressure variation induced by a well test; and identifying as faulted cells, all cells for which a corner or a vertex is in contact with the fault.

2. The method as claimed in claim 1 wherein said fast marching algorithm determines said front propagation in terms of the time of arrival of the front at a particular cell as a minimum of the times of arrival computed from any of its neighbours.

3. The method as claimed in claim 1, comprising the steps of:

attributing stratigraphic neighbours of the faulted cell to the neighbourhood of the faulted cell, said stratigraphic neighbours comprising those cells which would contact the faulted cell if the fault was not present;

removing from the neighbourhood of the faulted cell all those cells which are on an opposite side of the fault to the faulted cell; and adding to the neighbourhood of the faulted cell, the geometric neighbours of the faulted cell which are on the opposite side of the fault to the faulted cell.

4. The method as claimed in claim 1, comprising the steps of:

attributing the stratigraphic neighbours of the faulted cell to the neighbourhood of the faulted cell, said stratigraphic neighbours comprising those cells which would contact the faulted cell if the fault was not present;

determining the geometric neighbours of the faulted cell which are on the opposite side of the fault to the faulted cell;

removing from the neighbourhood of the faulted cell all those cells which are on the opposite side of the fault to the faulted cell, and which are not geometric neighbours; and adding to the neighbourhood of the faulted cell, the geometric neighbours of the faulted cell which are on the opposite side of the fault to the faulted cell and which are not already included in the neighbourhood of the faulted cell.

5. The method as claimed in claim 1, wherein each of said cells is a hexahedron.

6. The method as claimed in claim 1, said method further comprising the steps of:

performing a plurality of well test simulations using said fast marching algorithm;

performing a comparison of resultant data from each of said well test simulations and resultant data from a measured well test on the actual subsurface volume in order to rank the resultant data from said well test simulations according to whether they reproduce most closely the resultant data from the measured well test; and selecting a subset of the plurality of well test simulations according to the ranking of the resultant data from said well test simulations.

7. The method as claimed in claim 6 wherein said comparison step is performed by computing a distance between different sets of resultant data obtained from different well test simulations.

8. The method as claimed in claim 7 wherein the computing of distance between different sets of resultant data obtained from different well test simulations comprises using a dynamic time warping algorithm which associates every data point of the resultant data from a first of said well test simulations or measured well test to a corresponding data point of the resultant data from a second of said well test simulations or measured well test.

9. The method as claimed in claim 8 wherein said method further comprising the steps of:

constructing a set of vectors associating data points from the first of said well test simulations or measured well test to a corresponding data point from the second of said well test simulations or measured well test; and computing the distance between the data from the first of said well test simulations or measured well test and the second of said well test simulations or measured well test as the trace of a covariance of the difference between the every vector of said set of vectors and a vector which is the mean vector of said set of vectors.

10. The method as claimed in claim 6 comprising the step of using said subset of well test simulations in volumetric studies to estimate a porous volume in the subsurface volume and/or the volume of hydrocarbon or water present within the subsurface volume.

11. The method as claimed in claim 6 comprising the step of using said subset of well test simulations to predict the fluid flow in a geological reservoir and hydrocarbon and/or water production from said geological reservoir.

12. The method as claimed in claim 1, further comprising the step of using the results of said method to aid hydrocarbon recovery from a reservoir.

13. A computer program product comprising non-transitory computer-usable medium having computer readable program code embodied thereon, the computer readable program code adapted to be executed to implement a method comprising:

performing a fast marching algorithm so as to determine said front propagation in terms of a time of arrival of the front at a particular cell from at least one neighbouring cells which make up a neighbourhood of said particular cell;

wherein, for each faulted cell that is adjacent a geological fault, which is not aligned on an axis of the grid, the neighbourhood of said faulted cell is defined as comprising only its geometric neighbours, said geometric neighbours being all non-faulted stratigraphic neighbours and all other faulted cells on each side of the fault that are adjacent to or geometrically in contact with the faulted cell, regardless of stratification of the subsurface volume;

obtaining from said fast marching algorithm, an expression of a drained subsurface volume as a function of diffusive time of flight;

converting the expression to simulate a pressure variation induced by a well test; and identifying as faulted cells, all cells for which a corner or a vertex is in contact with the fault.

\* \* \* \* \*